March 31, 1925.  1,531,601
R. D. EVANS
ELECTRICAL PROTECTIVE DEVICE
Filed Nov. 5, 1920
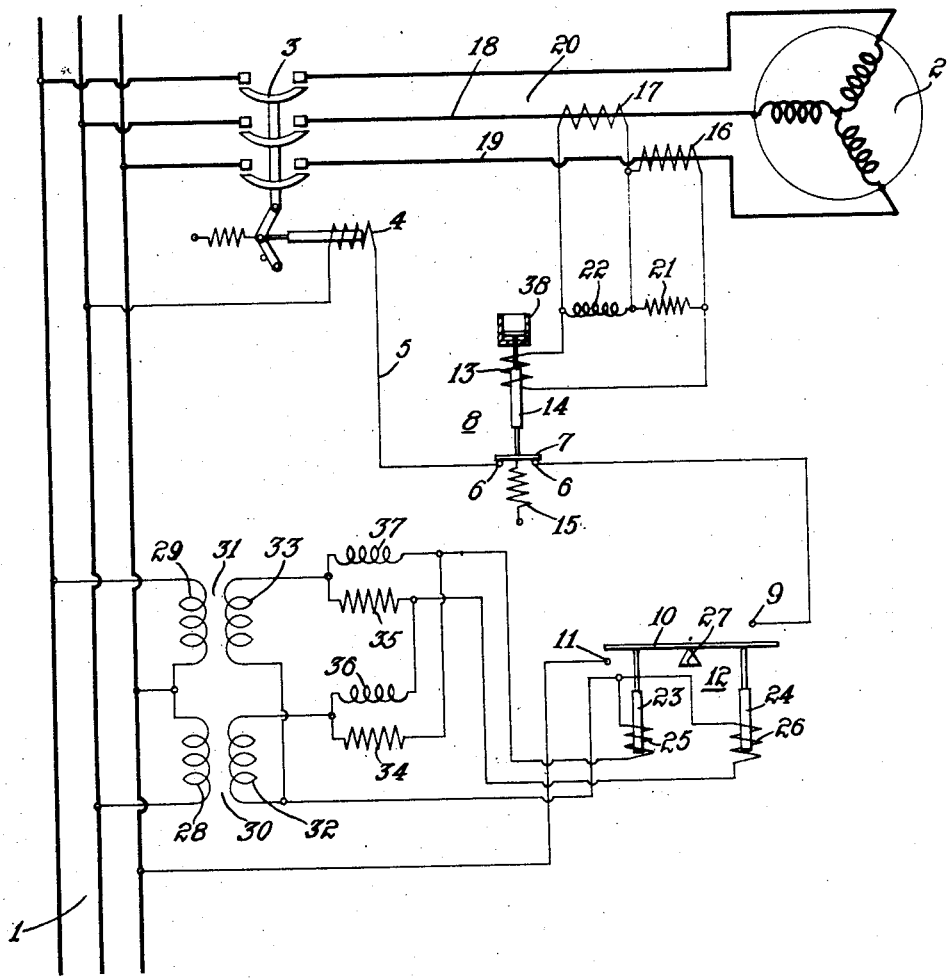
WITNESSES:
H. J. Shelhamer
J. E. Foster
INVENTOR
Robert D. Evans
BY
Wesley G. Carr
ATTORNEY Patented Mar. 31, 1925.

1,531,601

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed November 5, 1920. Serial No. 421,939.

*To all whom it may concern:*

Be it known that I, ROBERT D. EVANS, a citizen of the United States, and a resident of Pittsburgh, in the county of Allegheny and State of Pennsylvania, have invented a new and useful Improvement in Electrical Protective Devices, of which the following is a specification.

My invention relates to protective devices and particularly to protective devices for dynamo-electric machines.

One object of my invention is to provide a protective device that shall be responsive to phase-sequence components of electrical quantities.

Another object of my invention is to provide a device of the above indicated character that shall preclude the connection of a dynamo-electric machine to a circuit when phase failure, phase reversal, low voltage or excessive-current unbalance conditions obtain on the circuit.

A further object of my invention is to provide a protective device of the above indicated character that shall be simple and inexpensive to construct and effective in its operation.

In practicing my invention, I provide an electrically-operated switch or contactor for connecting the dynamo-electric machine to a circuit. The circuit of the electrically-operated mechanism of the switch is provided with two switches, one of which is controlled by a current-phase-sequence-component device and the other of which is controlled by a voltage-phase-sequence-component device. The two switches are so disposed and connected that they will close the circuit to actuate the switch for connecting the dynamo-electric machine to the circuit only when the positive phase-sequence component of the current is relatively high and when the positive phase-sequence component of the voltage is normal and will preclude the connection of the dynamo-electric machine to the circuit when the positive phase-sequence component of the voltage is low and when the negative phase-sequence component of the current is high. These various conditions obtain when the electric circuit is operated on single-phase, reverse phase, low voltage and unbalance. Thus, with my protective device, the dynamo-electric machine is adequately protected against operation on single-phase, phase reversal, low voltage and when the current unbalance in the circuit is relatively large.

While I have illustrated my protective device in combination with a dynamo-electric machine and a circuit, it is to be understood that it may be similarly employed for protecting connected circuits in an electrical distribution system.

The single figure of the accompanying drawings is a diagrammatic view of an electric circuit embodying my invention.

A three-phase alternating-current circuit 1 supplies current to a dynamo-electric machine 2 through an electrically-operated contactor or switch 3 which is provided with a closing coil 4. The closing coil 4 is connected in a circuit 5 comprising contact members 6 and 7 of a switch 8 and contact members 9, 10 and 11 of a switch 12.

The switch 8 comprises, besides the contact members 6 and 7, an actuating winding 13, a core member 14, a spring 15 for normally holding the movable contact member 7 in engagement with the stationary contact member 6 and a dash pot 38.

Two series transformers 16 and 17 are connected to two conductors 18 and 19 of a three-phase circuit 20, between the switch 3 and the machine 2. A resistor 21 is connected across the terminals of the transformer 16 and a reactor 22 is connected across the terminals of the transformer 17.

The winding 13 is connected across the series-connected resistor 21 and reactor 22 to cause the switch 8 to be responsive to the negative phase-sequence components of the current. In other words, the transformers 16 and 17 and the resistor 21 and the reactor 22 constitute a static network, substantially as set forth in copending application, Serial No. 370,229, filed March 31, 1920, by C. T. Allcutt and assigned to the Westinghouse Electric & Manufacturing Co. The winding 13 will attract the core 14 when a predetermined negative phase-sequence current traverses the circuit 20 to thus maintain the contact members 6 and 7 out of engagement.

The switch 12 comprises two movable core members 23 and 24, two windings 25 and 26 for the reception of the core members 23 and 24 and means, such as a pivot member 27, for pivotally mounting the contact member 10.

The primary windings 28 and 29 of two potential transformers 30 and 31 are connected across the respective conductors of the circuit 1, and the secondary windings 32 and 33 thereof are so connected to resistors 34 and 35 and reactors 36 and 37 that the windings 25 and 26, which are connected thereto, are supplied with positive phase-sequence voltage and negative phase-sequence voltage, respectively. With this arrangement, the contact member 10 will engage the contact members 9 and 11 when normal positive phase-sequence voltage obtains on the circuit 1; and will remain out of engagement when low positive phase-sequence voltage obtains, when only negative phase-sequence voltage obtains and when the circuit 1 is operating as a single-phase circuit. The contact members 9, 10 and 11 will remain out of engagement also when the phase of the circuit 1 is reversed.

Assuming the switch 3 to be in its open position and the switch 8 to be closed, if voltage is impressed on the circuit 1, the switch 12 will operate to close the contact members 9, 10 and 11 only when no fault obtains in the circuit 1. When the contact members 9, 10 and 11 close, the circuit 5 is completed and the switch 3 is closed. When the switch 3 is closed, the circuit 20 is energized and, if a relatively large current unbalance obtains, the switch 8 will open. Also, if a phase failure or phase reversal obtains in the circuit 1, the negative phase-sequence component of the voltage will increase and cause the core member 24 to be attracted by the winding 26 with a greater force than the positive phase-sequence current traversing the winding 25 attracts the core member 23 to thus disengage the contact members 9, 10 and 11 and de-energizes the coil 4 of the switch 3.

The voltage phase-sequence component network is substantially the same as that described in copending application, Serial No. 370,229, filed March 31, 1920, by C. T. Allcutt, and assigned to the Westinghouse Electric & Manufacturing Co.

The switch 8 is provided with a dash pot 38 to cause it to function slower than the switch 12, thereby precluding the pumping action of the recurrent closing of the switch 3 under predetermined conditions.

My invention is not limited to the specific arrangement illustrated, as it may be variously modified without departing from the spirit and scope of the invention, as set forth in the appended claims.

I claim as my invention:

1. In an electric circuit, the combination with a dynamo-electric machine, and means for connecting the same to the circuit, of means for so controlling the connecting means that the machine may be normally operatively connected to the circuit only when the positive phase-sequence components of the voltage is relatively high and the negative phase-sequence component of the current traversing the circuit is relatively low.

2. In an electric circuit, the combination with a dynamo-electric machine, and means for connecting the same to the circuit, of two switches for controlling the connecting means, means responsive to the phase-sequence component of the current for controlling one of the switches, and means responsive to the phase-sequence component of the voltage for controlling the other switch.

3. In an electric circuit, the combination with a dynamo-electric machine, and means for connecting the same to the circuit, of means responsive to the phase-sequence component of the voltage and the phase-sequence component of the current for controlling the connecting means.

4. In an electric circuit, the combination with a translating device, of means for precluding the normal operative connection of the translating device to the circuit when the negative phase-sequence component of the voltage of the circuit has a predetermined value.

5. In an electric circuit, the combination with a translating device, of phase-sequence-component-responsive means for precluding the normal operative connection of the translating device to the circuit under conditions of phase failure, phase reversal and relatively large current unbalance.

6. In an electric circuit, the combination with a translating device, of phase-sequence-component-responsive means for precluding the normal operative connection of the translating device to the circuit when the voltage of the circuit has no positive phase-sequence component.

7. In an electric circuit, the combination with a translating device, of phase-sequence-component-responsive means for precluding the normal operative connection of the translating device to the circuit when the positive phase-sequence component of the voltage of the circuit is relatively low.

8. In an electric circuit, the combination with a translating device, of phase-sequence-component-responsive means for precluding the normal operative connection of the translating device to the circuit when the positive and negative phase-sequence components of the voltage of the circuit are relatively low.

9. In an electric circuit, the combination with a translating device, of phase-sequence-component-responsive means for precluding the normal operative connection of the translating device to the circuit when the negative phase-sequence component of the current is relatively high.

10. In an electrical system, a distribution circuit, a supply circuit, means for connecting said circuits, and means for so controlling the connecting means that the circuits may be normally operatively connected only when the positive phase-sequence components of the volts is relatively high and the negative phase-sequence component of the current traversing the circuit is relatively low.

11. In an electrical system, a distribution circuit, a supply circuit, means for connecting said circuits and a pair of switches for controlling the connecting means, means responsive to the phase-sequence component of the current for controlling one of the switches, and means responsive to the phase-sequence component of the voltage for controlling the other switch.

12. In an electrical system, a distribution circuit, a supply circuit, means for connecting said circuits, and means responsive to the phase-sequence component of the voltage and the phase-sequence component of the current for controlling the connecting means.

13. In an electrical system, a distribution circuit, a supply circuit, means for connecting said circuits, and means for precluding the normal operative connection of the circuits when the negative phase-sequence component of the voltage of the system has a predetermined value.

14. In an electrical system, a distribution circuit, a supply circuit, means for connecting the circuits, and phase-sequence-component-responsive means for precluding the normal operative connection of the circuits under conditions of phase failure, phase reversal and relatively large current unbalance.

15. In an electrical system, a plurality of circuits, a circuit interrupter for connecting the circuits, and phase-sequence-component-responsive means for precluding the normal operative connection of the circuits when the voltage of the system has no positive phase-sequence component.

16. In an electrical system, a plurality of circuits, means for connecting the circuits, and means for precluding the normal operative connection of the circuits when the positive phase-sequence component of the voltage of the system is relatively low.

17. In an electrical system, a plurality of circuits, means for connecting the circuits, and means for precluding the normal operative connection of the circuits when the positive and negative phase-sequence components of the voltage of the system are relatively low.

18. In an electrical system, a plurality of circuits, means for connecting the circuits, and means for precluding the normal operative connection of the circuits when the negative phase-sequence component of the current is relatively high.

In testimony whereof, I have hereunto subscribed my name this 22nd day of October, 1920.

ROBERT D. EVANS.